United States Patent [19]

Hench

[11] Patent Number: 4,930,710
[45] Date of Patent: Jun. 5, 1990

[54] ROTARY CUTTER, PARTICULARLY FOR COMMINUTING PLASTIC MATERIAL

[76] Inventor: Hans Hench, Sonnhalde 31, D-7854 Inzlingen, Fed. Rep. of Germany

[21] Appl. No.: 349,632

[22] Filed: May 10, 1989

[51] Int. Cl.$^5$ .............................................. B02C 18/18
[52] U.S. Cl. .................................................... 241/294
[58] Field of Search .............. 241/293, 294, 295, 191, 241/195, 235; 144/174; 407/47, 49, 50, 51, 61, 108, 109

[56] References Cited

U.S. PATENT DOCUMENTS

| | | |
|---|---|---|
| 2,747,803 | 7/1952 | Hanse . |
| 3,865,164 | 2/1975 | Syberts . |
| 3,868,751 | 3/1975 | Holthuis . |
| 3,979,078 | 9/1976 | Böddeker . |
| 4,068,694 | 1/1978 | Schmidt . |
| 4,219,291 | 8/1980 | Hoeh . |
| 4,360,168 | 11/1982 | Petersen, Jr. . |
| 4,785,860 | 11/1988 | Arasmith ......................... 241/294 X |

FOREIGN PATENT DOCUMENTS

| | | |
|---|---|---|
| 0266447 | 5/1988 | European Pat. Off. . |
| 930839 | 12/1952 | Fed. Rep. of Germany . |
| 2208687 | 6/1973 | Fed. Rep. of Germany . |
| 2113138 | 6/1972 | France . |
| 2180088 | 11/1973 | France . |
| 2218945 | 9/1974 | France . |
| 2263820 | 10/1975 | France . |

Primary Examiner—Mark Rosenbaum
Attorney, Agent, or Firm—Frishauf, Holtz, Goodman & Woodward

[57] ABSTRACT

To provide for self-holding of cutter elements in grooves of a rotary cutter body (1; 100, 30, 33), which self holding is enhanced by centrifugal forces acting on the cutter elements, the grooves (2) in the body define first and second lateral support surfaces (13, 5), the cutter elements (6, 6a, 6b, 6c) define first and second engagement surfaces (12, 11) and a clamping element (7, 7') is provided defining an engagement surface facing the cutter element, the surfaces being so arranged that at least part of the first support surfaces (13) and at least part of the first engagement surface (12) of the cutter element form, in cross section, a wedge-shaped space which decreases in width towards the circumference of the cylindrical body, and each clamping element, in cross section, likewise is wedge-shaped and dimensioned and shaped to fit the wedge-shaped space. Preferably, the lateral support surfaces (5) define an acute angle with respect to each other. Clamping structures, for example formed by resilient insert (16, 17, 18–20, 22) are provided in the bottom of the groove to urge the clamping elements outwardly; alternatively, the clamping elements can be backed outwardly within the groove by screws passed therethrough and engaging the root (15) of the groove. To remove the cutter elements, it is only necessary to depress the clamping elements (7, 7') which, then, will release the wedging effect against the cutter elements, to permit their removal.

21 Claims, 7 Drawing Sheets

ROTARY CUTTER, PARTICULARLY FOR COMMINUTING PLASTIC MATERIAL

Reference to related patents and applications, the disclosure of which is hereby incorporated by reference:
U.S. Pat. No. 4,068,694, Schmidt
U.S. Pat. No. 2,747,803, Hanse
U.S. Pat. No. 4,219,291, Hoeh
U.S. Pat. No. 4,360,168, Petersen.
U.S. Ser. No. 07/365,784, filed June 14, 1989, HENCH entitled "ROTARY CUTTER TOOL, PARTICULARLY FOR SHREDDING PLASTICS"
Reference to related literature:
German Pat. No. 22 08 687, Sybertz.

The present invention relates to a rotary cutter, and more particularly to a rotary cutter especially adapted for comminuting plastic material. Such cutters have a body structure with a plurality of removable, replaceable strip or rib-like cutter elements fitted in grooves uniformly distributed around the circumference of the cutter body.

BACKGROUND

It is known to retain the elongated cutter elements, for simplicity hereinafter "cutter strips", by using an additional or separate clamping element or clamping strip which is located in the space between an engagement surface of the cutter strip and the groove and which clamps the cutter strip in position in the groove.

The referenced U.S. Pat. No. 4,360,168, Petersen, describes a cutter of this type in which two strip-like cutter elements are located in lateral recesses of the side walls of a groove, which are clamped in position by a wedge located between the cutter elements. The wedge is pulled by a screw or bolt in the direction of the bottom of the longitudinal groove. The cutter elements have narrow strips which are bounded by parallel lateral flanks, and are not supported radially with respect to the outer circumference. It is necessary to apply substantial clamping forces by the wedge-shaped clamping element, which becomes wider towards the circumference, in order to obtain reliable frictional engagement and holding of the clamping element against the cutter strips. The clamping strip must counteract the centrifugal forces acting on the cutter strips. It is difficult to exchange damaged or worn cutter elements since a substantial number of clamping screws must be loosened. These clamping screws are distributed over the axial length of the tool. The heads of the clamping screws are covered by cover elements and it has been found, from experience, that the wedge-shaped clamping strips, even after loosening of the clamping screws, have a tendency to jam in the grooves and can be released only with difficulty.

A cutter of a different type, see German Pat. No. 22 08 687, Sybertz, uses a cutter structure which is intended for a cutter shaft for a wood working machine, for example a planar or the like. Such cutters are not suited for comminuting of plastics. This cutter uses narrow strip-like laterally supported blades which have parallel flanks and which are fitted in longitudinal grooves of, in cross section, rectangular shape. Looked at from the direction rotation, wedge-shaped clamping elements are located behind the cutter blade strips. A movable intermediate holder is provided, fitted with an interengaging fit on the shaft of the tool, and positioned between the knives and the respective clamping elements, in order to accept and transfer clamping forces for the cutter knives. The clamping elements are supported with respect to the bottom of the longitudinal groove by compression springs. With respect to the cross section thereof, they taper towards the circumference of the cutter blade body, so that, upon operation and application of centrifugal force, they have a tendency to move outwardly to thereby increase the clamping force for the knives. The narrow knives are held radially only by interengaging fits without any specific supports. The intermediate body or holder which is located in the grooves of the tool body is an additional element which has to be carefully made and fitted.

THE INVENTION

It is an object to provide a rotary or circular cutter element, particularly for comminuting of plastic material, which is simple, lightweight, and permits easy and quick exchange of cutter elements or cutter strips by working from the circumferential surface of the cutter body, while of course also ensuring reliable and safe holding of the cutter blades in the body.

Briefly, in accordance with the invention, the cutter elements or strips define a first engagement surface facing a clamping element, both of which are located in a groove. The groove defines first and second lateral support surfaces, the cutter blade being engaged against one of them. The clamping element defines an engagement surface facing the cutter element. In accordance with a feature of the invention, at least part of the first engagement surface of the groove in the cutter body and part of the engagement surface of the cutter element facing the clamping strip form a space which, in cross section, is wedge-shaped, and which decreases in width towards the circumference of the cylindrical body. Each one of the clamping elements, in cross section, likewise is wedge-shaped and dimensioned and shaped to fit into that wedge-shaped space. Clamping means are provided engageable with the bottom of the groove and acting on the clamping elements for providing a radially outwardly extending clamping force to press the clamping element radially outwardly and support the clamping element between the first lateral surface of the groove and the, as far as the clamping element is concerned, opposite surface thereof which fits against the engagement surface of the cutter element.

The arrangement has the advantage that intermediate elements are not necessary, since the wedge-shaped clamping element is directly positioned between the support surface of the cutter element and the opposite side wall of the groove. This substantially simplifies the overall construction. The radial support of the cutter elements towards the outside ensures that any centrifugal forces which are applied on the cutter elements can be reliably accepted. Thus, the position of the cutter elements will not change in operation, and can be easily determined upon first placing the cutter elements. Assembly and disassembly of the cutter strips from the body is simple, so that cutter strips which are to be exchanged due to damage, wear or the like, or for resharpening, can be carried out easily from the circumference of the cutter body. It is only necessary, by means of a suitable arrangement, to press the wedge-shaped clamping elements counter the action of the clamping means radially inwardly in the respective longitudinal groove, thus releasing the clamping elements from their radial engagement. Since the clamping element or clamping strip is also accessible from the circumference, it can be easily pushed radially inwardly, and the clamping strip can then be readily removed from its longitudinal groove. It is then only necessary to lift out the cutter strip, replace it with for example a new one, and place the cutter strip in position. The clamping element then is reinserted, or the clamping action thereof again made effective. Due to the clamping means, the clamping strip is pressed into the wedge-shaped space between the support surface of the cutter element and the opposite side wall of the groove in radially outward direction, so that radial support of the thus radially supported cutter strips on the tool body is ensured. Any centrifugal forces which will act cannot lead to loosening of the clamping of the cutter strips, rather, they tend to increase the clamping forces due to the wedge-shaped space which, as noted above, decreases in width towards the circumference of the cylindrical cutter body.

Various types of clamping means may be used; they may be springs, for example undulating leaf springs; resilient longitudinal pins, gas springs or gas cushions operating similar to a gas spring or the like; clamping screws which bear against the bottom of the groove can also be used.

In accordance with a preferred feature of the invention, the cutter strips, in cross section, are essentially L-shaped. At least one of its legs has the wedge-shaped cross section. The engagement surface of the cutter element is then, preferably, positioned at the innermost side of the associated leg. Such cutter elements can also be made to be reversible, so that the cutter element is formed with two identical legs, each one carrying a cutting or knife surface, and which can be inserted in the respective groove either side up, thus permitting replacement of a worn edge by a new one by merely reversing the cutter element.

DRAWINGS

DETAILED DESCRIPTION

Figure 1:
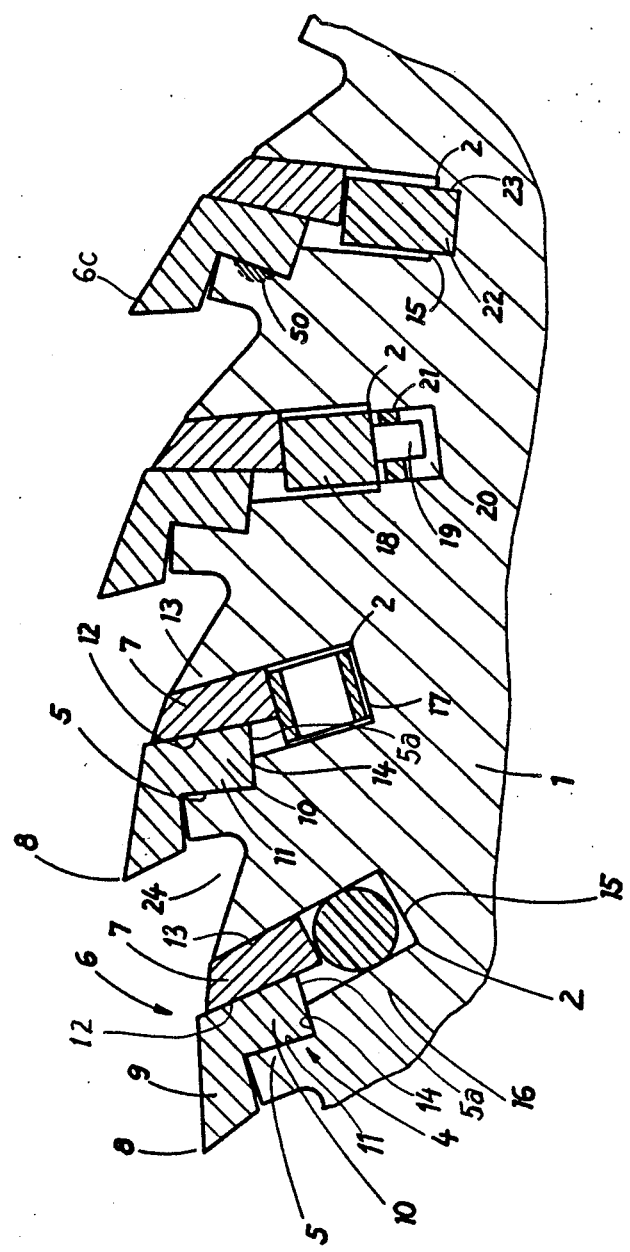
FIG. 1 is a fragmentary cross-sectional view through a rotary cutter, to an enlarged scale, and having four slightly different cutter wedging arrangements thereon, which can all be used on one cutter.
Figure 8:
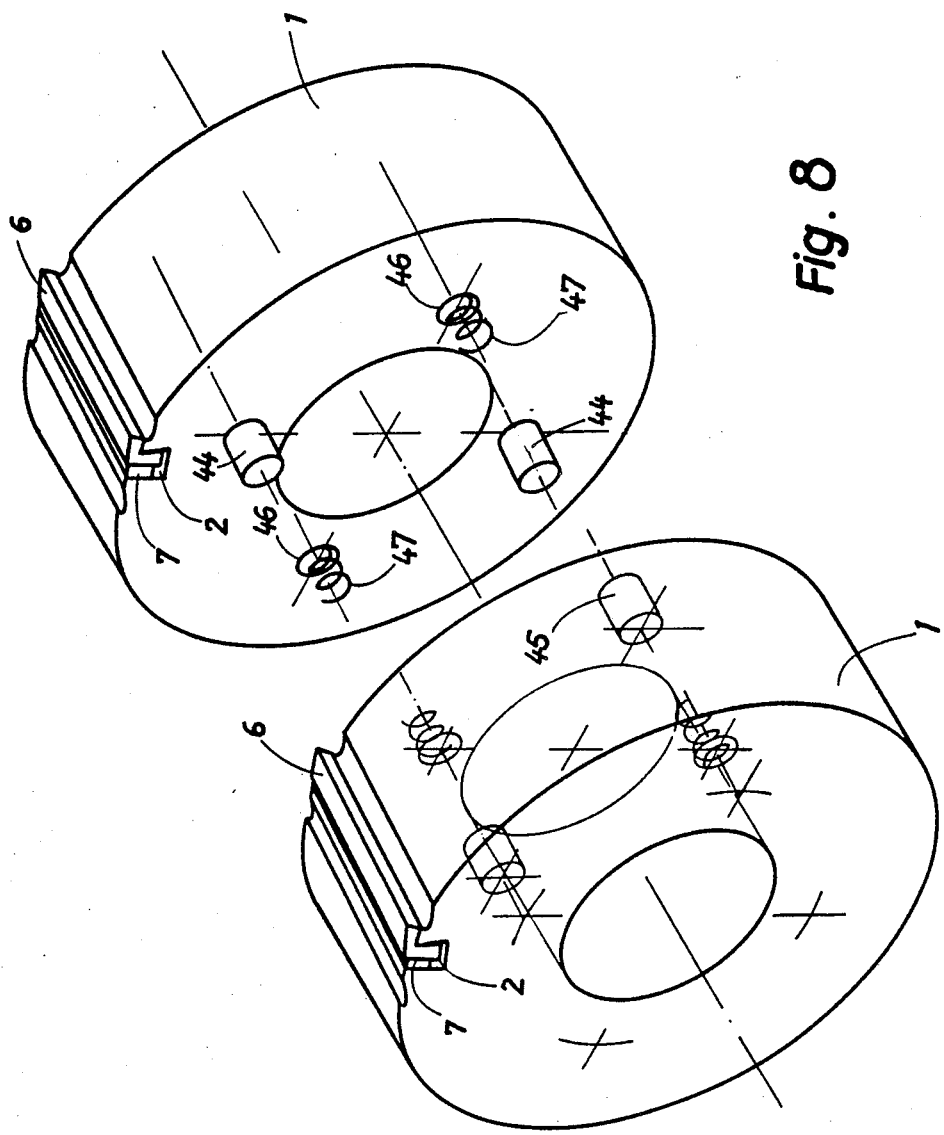
FIG. 8 is a perspective exploded view of a cutter structure formed in two body sections.

Referring first to FIG. 1:

A body 1, which forms a body of rotation, is either a massive, solid cylindrical element or a sleeve or ring-like cylindrical element. FIG. 8 shows a two or dual-body structure. The body 1 is intended to be coupled to a shaft to rotate therewith. The shaft extends beyond the tool element to form stub shafts, with which the body 1 can be retained in suitable bearings for rotation therein. The cutter is used, specifically, for comminuting of plastics and is especially and excellently suitable to comminute plastics which have additives such as mineral fibers and the like therein.

Figure 7:
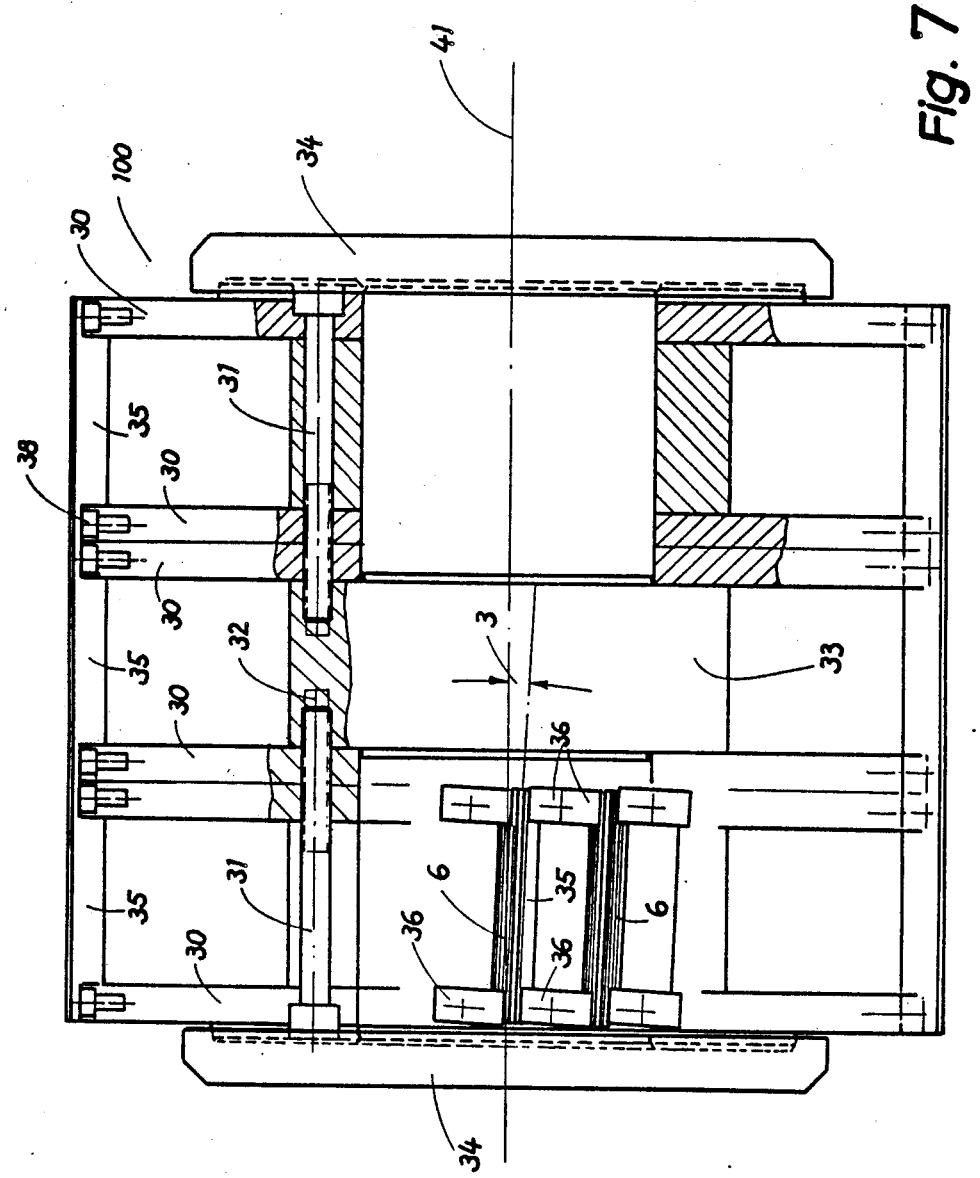
FIG. 7 is a side view, partly in section and partly cut open, of a cutter structure as illustrated in part in FIGS. 4 and 5.

The body 1 has, uniformly distributed about its circumference, a plurality of longitudinal grooves 2 which extend over the entire axial length of the body. The grooves 2 are not exactly parallel to the axis but, rather, include a small angle 3 with the axis, as seen, for example, in FIG. 7. The angle 3 shown in FIG. 7 is somewhat enlarged, for ease of illustration. A suitable angle is about 2°.

The grooves 2 are stepped and form a lateral recess 4 which is open towards the circumference of the body 1. The side surface of the recess 4 forms a lateral support surface 5 for a cutter element or cutter strip 6 which, together with a clamping element 7, is located in the longitudinal groove 2. The clamping element 7, in cross section, is wedge-shaped.

The cutter strips 6, 6a, 6b, 6c (FIGS. 1,2) are rib or strip elements made, preferably, of a hard metal, or stellite, or ceramics. The cutter strips can be unitary single-element or multiple-element constructions. If made of hard metal, the cutter elements can be applied on a suitable carrier body, for example by being soldered or brazed thereon. The cutter elements 6, 6a, 6b, 6c are so located on the body 1 that the effective cutting edges 8 are on a common circle or, rather, on a cylinder of rotation.

In the embodiment of FIG. 1, each one of the cutter elements is, essentially, L-shaped in cross section, defining two legs 9 and 10.

In accordance with a feature of the invention, both legs 9, 10 are wedge-shaped in cross section. The leg 10 which is located in the groove 2 is so tapered or wedged that the smaller cross-sectional area lies towards the circumferential surface of the body 1. The cutter element is formed with two lateral engagement surfaces. One of them is the engagement surface 11, which is engaged by the lateral support surface 5 of the body 1. Opposite engagement surface 11 is the engagement surface 12 which is engaged by the wedge-shaped clamping element or clamping strip 7. Clamping strip 7, thus, is engaged against the engagement surface 12 on the one side, and against the support surface 12 support surface 13 of the groove 2 opposite support surface 5 on the other. The leg 10 of the cutter strip 6 further has an abutment surface 5a which is abutted against the bottom surface 14 of the stepped recess 4. Surface 5a forms an abutment surface for the cutter strip 6. In accordance with a feature of the invention, the space between the engagement surface 12 of the cutter element and the lateral support surface 13 of the groove converges, wedge-shaped or tapering towards the circumference of the body 1. Thus, the smaller dimension is adjacent the circumference strip 7 of the body. The clamping strip 7 which, likewise, is wedge-shaped in cross section and tapers towards the circumference of the body 1 is pressed in position between the support surface 13 of the groove and the engagement surface 12 of the cutter element by clamping arrangements which may be resilient (FIG. 1) or formed by screws engaging the bottom surface 15 of the groove 2. Strip 7, at its outer surface, is essentially flush with the adjacent surface of body 1, or extends slightly thereover (see FIGS. 1, 2 and 3).

In some arrangements is may be desirable to have different kinds of resilient clamping arrangements pressing the clamping element 7 into the wedge-shaped space to clamp the cutter elements 6. FIG. 1 shows four such different structures, all to be used on the same cutter element, for example. Of course, cutter elements can also be constructed in which the clamping elements for all the cutter elements are identical.

The leftmost groove 2 has an elongated cylindrical resilient clamping element 16 inserted therein. Element 16 may for example be a compressible elastomer cylinder, such as a rubberized or compressible deformable plastic element.

The cutter element 6, next right to the leftmost one, uses as a clamping arrangement a longitudinal spring 17 which can be constructed in form of an undulating spring or leaf spring element. The next resilient clamping arrangement is formed by a cylindrical space 20 which is filled with a gas and which is sealed with respect to the remainder of the space by a seal 21. The gas is trapped within the space 20 into which a cylindrical piston extension 19, projecting from a piston 18, extends. Piston 18, thus, is in the resilient engagement with the clamping strip 7, and the gas-filled space 20 acts as a gas pillow or gas cushion, the entire structure providing for resilient pressure towards the circumference in dependence on gas pressure applied to the space 20. Such gas pressure can be applied externally and, once the pressure is established, the piston 18 will be maintained resiliently biassed towards the outside of the body 1, the entire system operating similar to a gas spring.

The rightmost arrangement shows an elastomer pin or block 22 which is located in a recess 23 projecting inwardly of the body 1 from the root or bottom 15 of the groove. The element 23, similar to element 16, can be a rubber structure or other elastomer.

The legs 10 of the cutter element 6 are so arranged in the recesses 4 of the body 1 that the seating surface 5 forms a secant with respect to a theoretical circle defining the circumference of the body 1.

The centrifugal force will, in operation of the cutter and upon rotation of the body 1, have a component extending radially outwardly. The surface 14 may be located transversely to a radial line through the center of the surface 14, thus form a chord, therefore will be at right angles to the centrifugal force. The radial forces will have a a component at right angles to the inclined seating surface 5 which has the tendency to press the leg 10 of the cutter element 6 with its engagement surface 11 against the support surface 5 of the groove. The cutter elements 6, thus, are radially supported by the inclined engagement surfaces 11 and the likewise inclined support surfaces 5 of the groove of the body with respect to a radial line.

The engagement surface 12 of the cutter strip and the support surface 13 of the groove, opposite the surface 5, form an acute angle with respect to each other which is sufficiently small to provide for self-locking of the wedge-shaped clamping element or clamping strip 7. The value of this angle depends on the respective materials defining the engagement and support surfaces. Similarly, the support surface 5 and the engagement surface 11 include an acute angle of such a value that a self-locking or self-seating effect will be obtained.

The engagement surface 11, as best seen in FIG. 1, is located at the inner surface of the L-shaped cutter strip 6. The cross-sectional L shape of the cutter element 6 has the advantage of high stability of the cutter elements. The highly stressed region immediately adjacent the cutting edge 8 is supported by the outer surface of the leg 9 of the respective cutter element, particularly when it is made of hard metal, and thus will be highly resistant to wear and to external damage. The tool body 1, as well known, is constructed with chip recesses 24, in advance of the cutting edge 8 and formed in the tool body 1.

Figure 2:
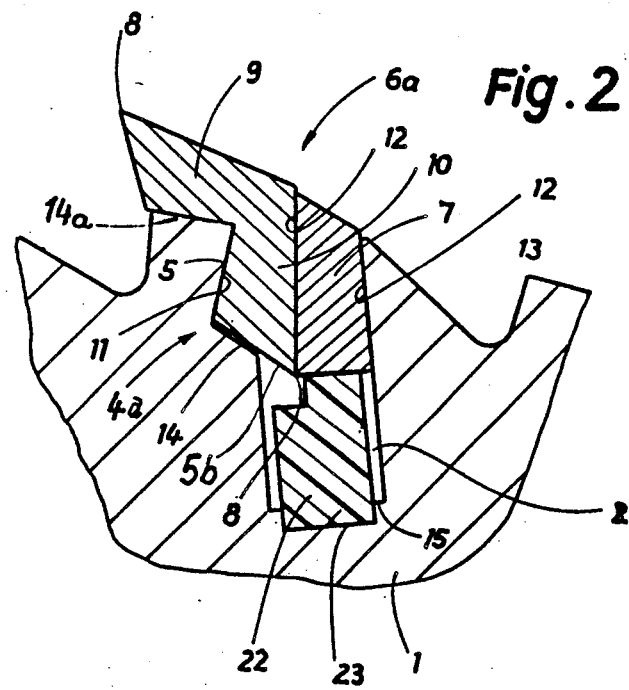
FIG. 2 is an enlarged fragmentary cross-sectional view illustrating a different form of cutter, and which is reversible and has two cutting edges.

FIG. 2 illustrates an embodiment which differs from that of FIG. 1 in that the cutter element 6a is a dual-edge cutter. The two legs 9, 10 which are similar to the legs 9, 10 of cutter strip 6 of FIG. 1, are identical in the element 6a. Each one of them carries a cutting edge 8.

The recesses 4a are formed with seating surfaces 5 as before. The bottom surface 14, however, of the recess 4a is shaped to match the end surface 5b of the respective leg 10 seated thereagainst. The seating surface 14a immediately adjacent the groove 2 is located at the circumference of the body 1.

Figure 3:
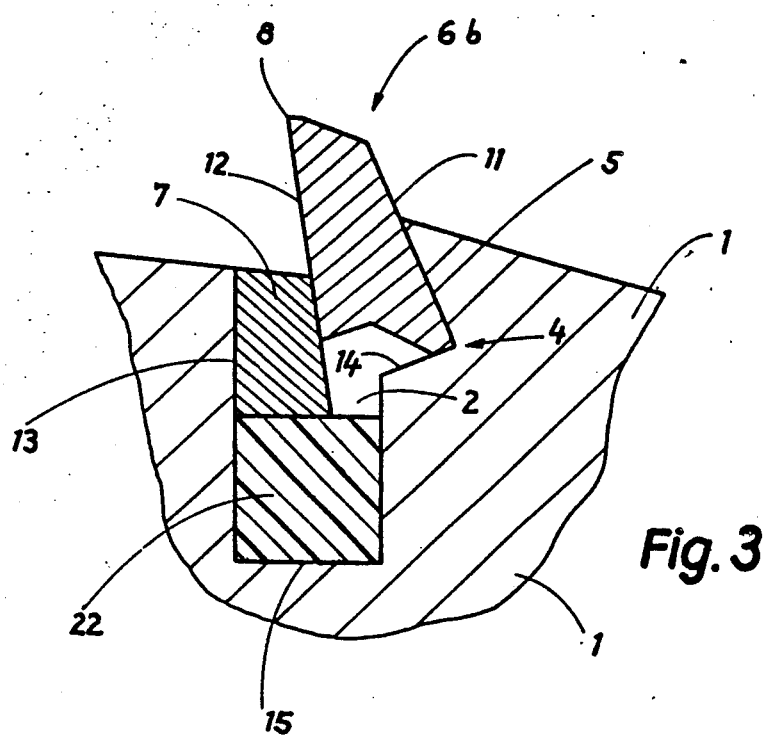
FIG. 3 is a view similar to FIG. 2 and illustrating yet another cutter element.
Figure 5:
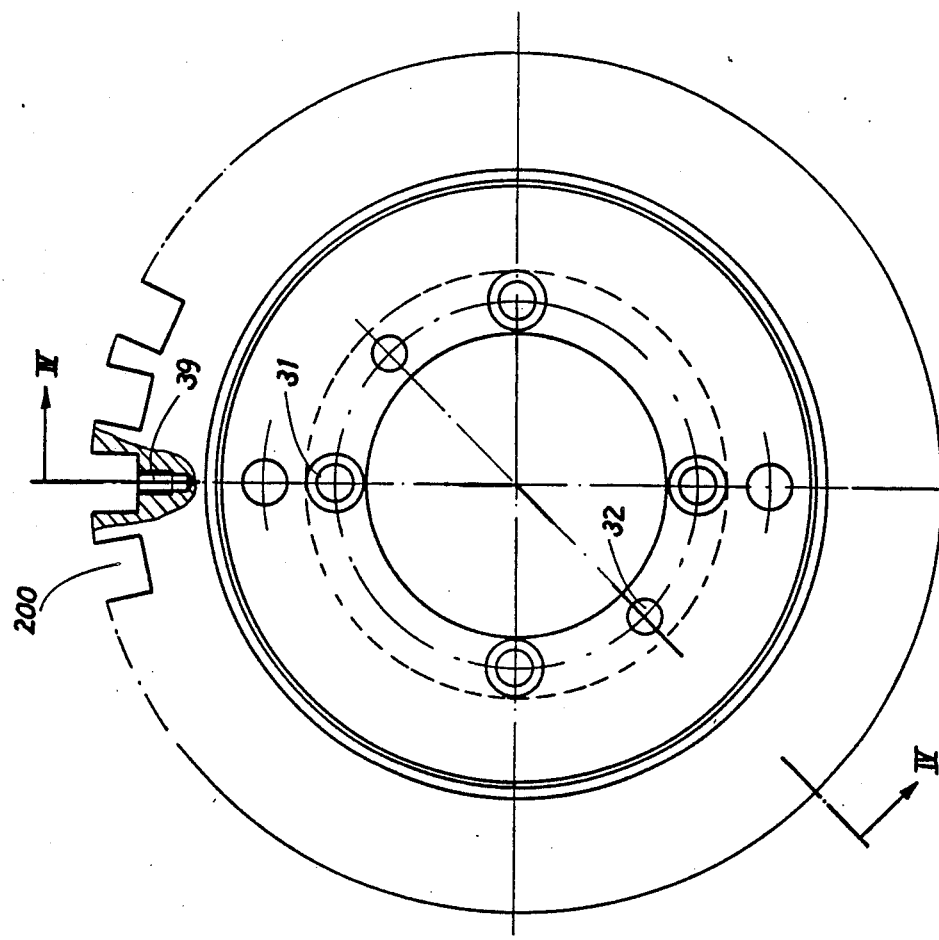
FIG. 5 is an end view of the cutter of FIG. 4.

FIG. 3 illustrates yet another embodiment in which the cutter strips 6b have only a single projection of essentially wedge-shaped cross section. The engagement surfaces 11, 12 of the cutter elements 6b extend radially outwardly, tapering, with decreasing width, towards the outside of the circumference of the body, and, contrary to FIGS. 1 and 2, are located behind, in the direction of rotation, the clamping strip 7. The clamping strip 7 in FIG. 3, thus, is at the front side of the cutter strip 6b, fitting again against the first lateral support surface 13 of the groove 2.

REPLACEMENT OF CUTTER ELEMENTS:

To replace the cutter elements 6, 6a, 6b, the clamping strip 7 is pressed radially inwardly from the circumference of the tool body 1 and counter the resilient force of the springy clamping structures 16, 17 22, or the gas pressure of the gas spring 18–20. The release pressure is applied such that the leg 10 or, respectively, the cutter element 6b, comes free of the clamping strip 7 so that it can be removed readily. A new or resharpened cutting strip can then be inserted.

The new cutting strip can be machined outside of the tool body 1 to precise dimensions. It is inserted into the groove 2, adjacent the support surface 5, until it engages the respective bottom of the groove, or recess 4, 4a, or surface 14 (FIG. 1). Release pressure against the clamping strip 7 is then terminated so that the resilient element can press the clamping strip 7 into the wedge-shaped space between the engagement surface 12 of the cover element and the lateral support surface 13 of the groove 2, thus additionally clamping the respective cutter strip 6, 6a, 6b with its engagement surface 11 against the other or second lateral support surface 5 of the groove 2. Centrifugal forces, occurring in operation, then have the tendency to push the clamping strip 7 outwardly, thus increasing the tightness of clamping against the cutter strip 6, 6a, 6b. If the seating surfaces 5 are at an inclination differing from radial direction, the cutter elements are, as noted above, simultaneously supported radially towards the outer circumference of the body.

For some arrangements, and particularly for machines of substantial axial length, it may be desirable to form the body not as a single solid element but, rather, as a composite of body elements coupled together to obtain rotor with, for example, spaced disks. This also permits granulated material to fall inwardly of the cutters.

Figure 4:
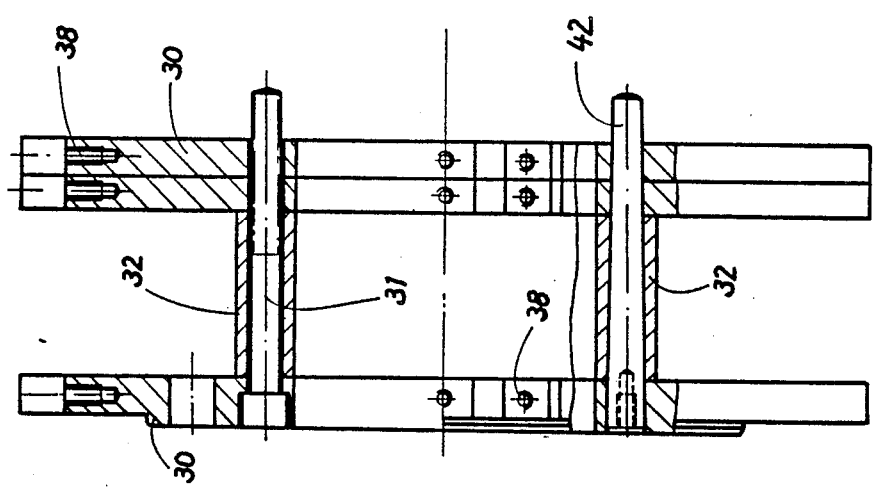
FIG. 4 is a fragmentary part cross-sectional view of a multi-disk support body for the cutter elements, and taken along the broken section of IV—IV of FIG. 5.
Figure 6:
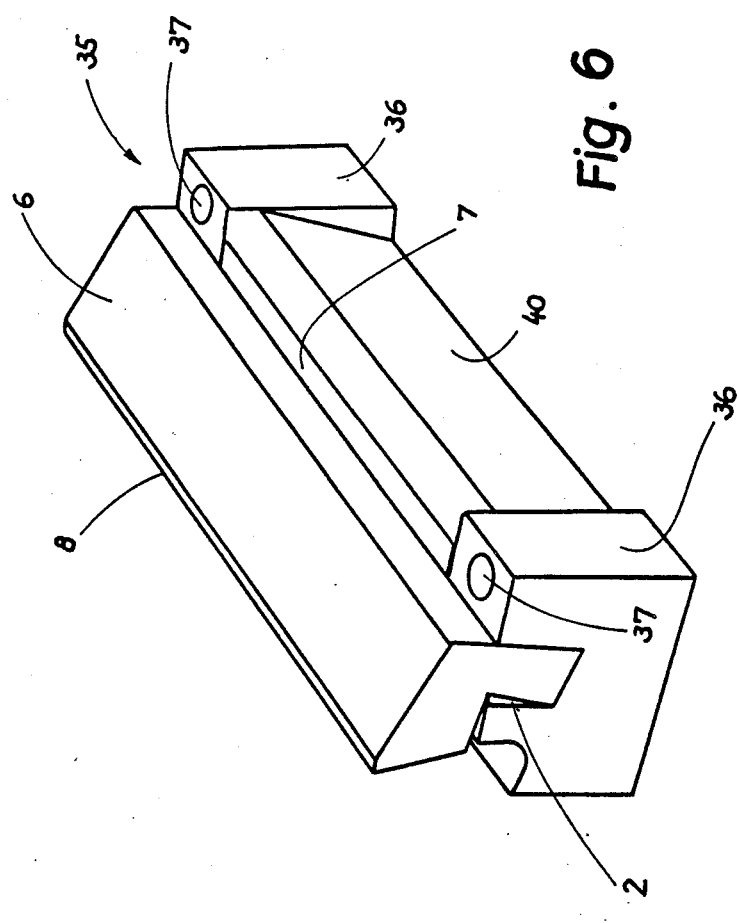
FIG. 6 is an enlarged part-perspective view of a cutter element held in position by a holder block.

FIGS. 4 to 7 illustrates an embodiment in which a rotor 100 (FIG. 7) is used, formed of a plurality of body elements in shape of ring disks 30. The ring disks 30, as best seen in FIGS. 4 and 7, are clamped together by bolts 31, so that they are axially tight with respect to each other. Spacer sleeves 32 are located between outer disks 30, the clamping screws 31 passing through the spacer sleeves. The clamping screws or bolts 31 are screwed into suitable bores 31' of a central hub disk 33 (FIG. 7). The end surfaces of the hub 33 have ring disks 30 secured thereto. The rotor 100 is covered or closed at its end sides by closing caps 34, retained in any suitable manner, and is secured to a shaft, not shown, to rotate therewith, as well known.

The ring disks 30 are formed with grooves at 200 at the outer side, open towards the circumference, and uniformly distributed about the circumference, and extending over the entire axial length of the rotor 100 in alignment with each other. Rail or strip-shaped cutter element carriers 35 (FIG. 6) are inserted in the grooves 200.

Each of the carriers 35 has end flanges 36 fitting into the grooves 200. The flanges 36 carry bores 37 for attachment screws 38 fitted in suitable tapped bores 39 on the bottom of the grooves 200. Each one of the cutter element carriers 36 is inclined in the region between the end flanges in order to permit free passage or granulate therethrough, arising in operation of the machine.

The cutter strip carriers 35, each, include the longitudinal groove 2 which, in the region between the flanges 36, has the same cross section as the body 1, illustrated in FIGS. 1-3. The respective cutter strips 6, or 6a, 6b, are retained in the groove 2 by a wedge-shaped clamping strip 7, in the manner described in connection with FIGS. 1-3.

Cutter element carriers 35 located on adjacent pairs of ring disks 30 are abutted against each other, together with the cutter strips 6, so that a continuous cutter edge will result, extending throughout the length of the rotor 100, which will form the small angle 3 (FIG. 7) with the axis of rotation 41 of the rotor.

FIG. 8 illustrates an embodiment in which the rotor or cutter body is formed of a plurality of body cylinders, coaxially arranged next to each other. The body cylinders 1a, 1b, each one of which can be identical to the body 1 described in connection with FIG. 1, are secured to a common shaft, not shown, to rotate therewith. They can be clamped together by a suitably threaded axially acting clamping ring. To ensure precise match of the respective grooves in the body elements 1a, 1b, locating pins 44 fitting into associating locating grooves 45 are provided on the facing surfaces of the body elements 1a, 1b. Pressure springs 47, seated in suitable bores 46 in the respective cutter elements, are likewise provided, the pressure springs having the tendency to push the elements 1a, 1b axially from each other.

The arrangement has the advantage that the cutter strips 6 can be made of shorter axial length and, thus, if a portion only of a cutter strip needs to be sharpened and replaced, the respective strip 6 on any one of the elements 1a, 1b can be exchanged. Axial clamping of the elements 1a, 1b is released, for example by releasing a threaded screw at the end of the shaft, which permits the springs 47 to press the elements 1a, 1b from each other to such an extent that the end faces of the cutter strips 6 will become released and the respective clamping elements of the body, the cutter element of which is to be replaced, can be depressed, and the cutter element 6 removed as previously described.

The respective cutter strips 6 can be exchanged not only in the solid bodies 1 as described, but also in the rotor 100, see FIG. 7, or in the multiple body structure of FIG. 8. If the rotor of FIG. 7 is to be used, any disks 30 which are not coupled by carriers 35 should, preferably, have bores 46 therein to retain springs 47 (FIG. 8) to permit easy separation of the respective disks 30.

The resilient force of the respective clamping arrangements to push the clamping elements 7 outwardly permits exchange of the cutters strips 6, 6a, 6b simply and practically without tools. Radial support of the cutter elements 6, 6a, 6b or of the cutter element 35 on the respective body 1 can also be obtained by an interengaging arrangement, for example by forming a projection 50 (FIG. 1, rightmost cutter blade 6c) thereon, fitting into a matching recess in the body 1. The size of the recess and of the projection, as well as the angles of convergence towards the circumference of the respective wedge-shaped spaces, will determine the extent of depression of the clamping element 7 necessary to release the respective cutter element.

Figure 10:
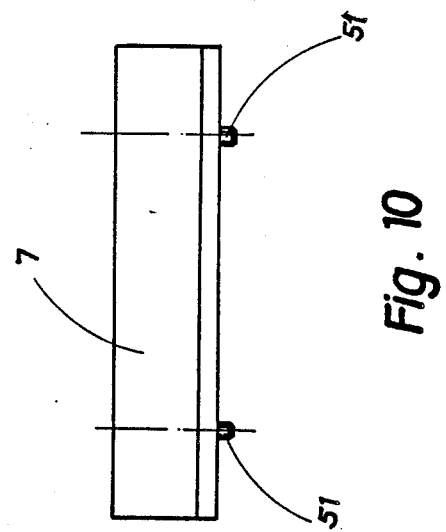
FIG. 10 is a side view of the clamping element of FIG. 9.
Figure 9:
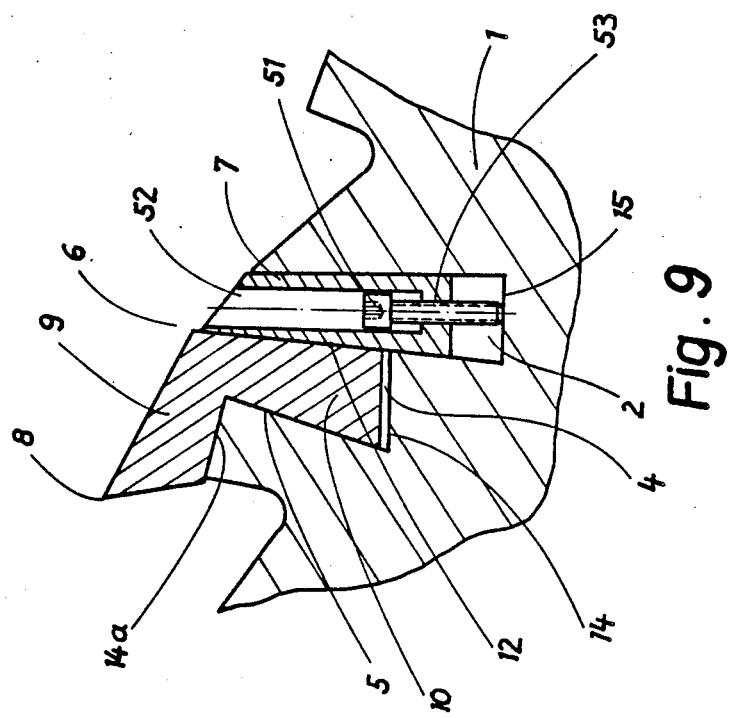
FIG. 9 is an enlarged cross-sectional view similar to FIG. 2, illustrating a different form of cutter and clamping element.

A fixed retention of the cutter elements or strips is shown in the embodiment of FIGS. 9 and 10. The essentially L-shaped cutter element 6 is similar to that described in connection with FIG. 1. The recess 4, in circumferential direction, is made so deep that the entire leg 10, which tapers outwardly, is essentially entirely received in the recess 4. The engagement surface 12 of the cutter element 6 extends only somewhat over the adjacent longitudinal side wall of the groove into the interior of the groove 2. By suitable shaping of the clamping element 7, with a shoulder engaging on the engagement surface 12, the legs 10 can be flush with the side wall of the longitudinal groove 2. The wedge-shaped clamping strip 7 is formed with two or more bores 52 which are open towards the circumference of the body 1, into which screws 51 are tapped. The screws 51 are screwed in the bottom of the clamping element 7, fitted into a bore 52 thereof, so that they can engage the bottom 15 of the groove 2. Spring elements or resilient elements can be located between the clamping screws 51, for example as discussed in connection with FIG. 1. Such resilient elements may not be needed, in dependence on the number of screws 51 to be used and/or the particular uses of the apparatus.

EXCHANGE OF CUTTER 6, EMBODIMENT OF FIGS. 9 AND 10

The screws 51 have Allen heads, so that they can be loosened from the outside of the circumference of the body 1, thereby permitting the clamping strip 7 to be pushed inwardly in the longitudinal groove 2. Due to the wedge-shaped surface 12, a cutter strip 6 thus is released to such an extent that the cutter strip 6, with its wedge-shaped leg 10, can be removed from the recess 4 by lifting it out from the body 1 away from the circumference of the body 1. After insertion of a new cutter strip 6, it is only necessary to tighten the screws 51 which then will engage the bottom or root 15 of the groove, thereby pressing the clamping strip 7 radially outwardly and clamping the cutter strip 6 in position.

If it is desired to include additional springy elements 16, 17, 18, 22 in the structure of FIG. 9, the springy elements initially press the clamping strips 7 radially outwardly into the clamping position. After this initial clamping is obtained, the screws 51 are tightened towards the bottom of the groove in order to further increase the clamping effect and thus additionally ensure reliable holding of the cutter strips 6 in position, even during high-speed operation and hence occurrence of substantial centrifugal forces.

In accordance with a feature of the invention, the seating surface 11 of the cutter strips 6 should be located along a secant with respect to a circle formed by the cutter body when it rotates, since this results in particularly desirable cutting and comminuting relationships for the cutter elements 6. Further, radially directed centrifugal forces and acting along the seating surface will then have a component which has the tendency to press the engagement surface of the cutter element against the matching support surface 5 of the groove 2.

By suitable choice of the support surface of the groove, that is, to place the support surface in a plane relating to the axis of rotation of the body, support and clamping forces of any desired level can be obtained. The engagement surfaces and support surfaces, when including an acute angle with respect to each other on opposite sides of the groove, will result in a self-clamping or self-holding arrangement, thus further increasing the reliability of the support system.

The lateral support surface 5, preferably, is located laterally from the recess 4 formed adjacent the groove in the tool body 1. The bottom 4 then can form a support surface for the cutting element. This simply and reliably ensures that, after insertion of the cutter elements or strips, all the cutting edges 8 thereon will run on a common circumference upon rotation of the body 1. The bottom of the recess 4, thus, can be formed as an abutment surface for the cutter strips 6, 6a, 6b although different arrangements may be used, in which the bottom of the groove against which the cutter elements or other elements engage is formed with adjustment structures which permit to adjust the engagement, particularly radial engagement, of any specific cutter element with respect to the bottom of the groove. One such arrangement, for example, could be a spindle with an eccentric circumference.

The clamping strips 7, in operation, provide radially outwardly directed clamping forces by centrifugal action; they are prebiassed by springs or other resilient elements. The elements 16, 17, 18, 20, 22, for example, can be elongated undulating springs 17, introduced in form of elongated spring elements into the groove 2. The springs could also be formed as elastic pins or spring blocks 22, upwardly placed in the bottom 5 of the groove 2. The springy support can also be obtained by a gas pillow or gas cushion in an enclosed space 20 (FIG. 1).

The portion of the cutter strip 6, 6a, 6b extending into the groove 2, and tapering with decreasing cross section towards the outside of the body 1, is, preferably, essentially wedge-shaped. The respective engagement surface 12 then, with respect to the opposite support surface 13 of the groove 2, again, will form an acute angle which, with the cooperating surfaces, and materials used, will provide a self-clamping or self-seating arrangement.

The tool body 1, at least in the outer circumferential regions, can be a massive structure, so that the longitudinal grooves 2 are cut immediately into the material of the body. To make a more lightweight structure, the embodiment of FIGS. 4–7 can be used. This is particularly suitable for cutters of output and power, and especially if the longitudinal grooves have substantial axial length, that is, are intended to retain longitudinal cutter strips 6 of substantial axial extent, of forming parts of elongated cutter structures.

If the axial length of the tool is to be extended, then, preferably, the structure is built in modular form based on a number of coaxial, circular carriers; the cutter elements are formed of sections, abutting each other along matching edges, and, in combination, extending over the axial length of the overall cutter structure to define continuous cutting edges. It is still possible to provide for replacement of individual cutter blade or strip sections; for easy accessibility, and in accordance with a preferred form, adjacent sections are coupled together along their side faces to rotate together by suitable fitting pins and openings, positioned between adjacent sections; axially directed springs 46 provide axial bias tending to separate the respective elements along the junctions of adjacent body portions. Upon loosening an axial clamping nut, the body portions or disk portions 30 will be spread to such an extent that the cutter strip sections will separate at their abutting end faces so that they can be readily, individually, replaced by depressing the respective holding structure 16, 17, 18–20, 22 and/or the clamping screws 51, to thereby depress the clamping strip 7 and permit release of the respective cutter element section. This is not readily possible when the tool body is axially clamped since, then, the cutter strip sections will also be axially clamped against each other.

Screw holders, as explained in connection with FIGS. 9 and 10, for the clamping strip 7' can be used independently or in combination with the resilient supports 16, 17, 18–20, 22 (FIG. 1). For some installations, it may be desirable to use only a plurality of bolts 51.

A construction which, as shown, utilizes Allen head pressure bolts, as described in connection with FIG. 9, is particularly simple. Other arrangements may be used, for example by placing clamping screws in suitable bores or holes of the tool body 1, accessible from the shaft axis, or otherwise from the interior of the body to apply or, respectively, release pressure against the clamping strip 7. Other clamping arrangements, for example accessible from the side of the tool body and, for example, controlled by fluid pressure or eccentric elements may be used.

The lateral support surfaces of the grooves and the engagement surfaces of the cutter elements can be arranged to be essentially in alignment; this is not necessary, however, and, in dependence on design considerations, the engagement surfaces of the cutter elements can be arranged to project only slightly over the interior of the groove.

Various changes and modifications may be made and any features described herein in connection with any one of the embodiments may be used within the scope of the inventive concept.

I claim:
1. Rotary cutter, particularly for communicating plastic materials, having
   a cylindrical body (1, 30, 33, 35, 100) having a plurality of essentially axially directed circumferentially uniformly distributed grooves (2) formed in the surface thereof, wherein each groove (2) defines a first lateral support surface (13) and a second lateral support surface (5) extending to the circumference of the cylindrical body;

a plurality of axially elongated removable cutter elements (6, 6a, 6b, 6c) and having a radially inwardly extending portion (10) extending into a respective groove; and a plurality of elongated clamping elements (7, 7') located in the respective grooves for clamping the cutter elements therein, wherein said cutter elements (6, 6a, 6b, 6c) define a first engagement surface facing one (13) of said support surfaces (5, 13) of the groove, a second engagement surface (11) facing the other (5) of said support surfaces of the groove (2) and a third support surface (5a; 5b);

at least part of said first lateral support surface (13) of the groove (2) and at least part of the engagement surface (12) of the cutter element (6, 6a, 6b, 6c) forming, in cross section, a wedge-shaped space which decreases in width towards the circumference of the cylindrical body (1, 30, 31, 33, 35, 100) and which opens into the circumference of the cylindrical body;

each clamping element (7, 7') defines a clamping surface facing said first engagement surface (12) of the cutter element, and wherein each clamping element (7, 7') in cross section is wedge-shaped and dimensioned and shaped to fit in said wedge-shaped space and to extend substantially to the circumference of said cylindrical body;

clamping means (16, 17, 18, 20, 22, 22; 51) are provided located in the groove (2) and acting radially outwardly on the clamping elements (7, 7') for providing a radially outwardly directed clamping force to press the clamping element radially outwardly and support the clamping element between said first lateral support surface (13) of the groove (2) and against said engagement surface (12) of the cutter element, whereby the cutter element will be clamped into position in said wedge-shaped space which decreases in width towards the circumference of the cylindrical body and the clamping force will increase upon rotation of the cutter element due to centrifugal force;

wherein said radially inwardly extending portions of the cutter elements have a cross section which tapers, or is wedge-shaped with decreasing width in the direction of the circumference of the cylindrical body and which have a maximum width which is smaller than the width of the groove (2) at its open end at the circumference of the cylindrical body; and wherein the cylindrical body is formed with abutment surface means (14, 140) for engagement with the third support surface (5a) on the cutter elements (5b) for determining the radial position of the cutter elements on the cutter in a radially inwardly extending direction and independently of any cutting edges on said cutter elements.

2. The cutter of claim 1, wherein the second lateral support surface (5) of the groove (2) is located on a secant with respect to a theoretical circle defined by said cutter upon rotation thereof.

3. The cutter of claim 1, wherein said first lateral support surface (13) of said groove (2) and the engagement surface (12) of the cutter element define an acute angle with respect to each other.

4. The cutter of claim 1, wherein the groove is formed with a lateral recess (4) and said second lateral support surface (5) extends from said recess (4) towards the outer circumference of the cylindrical body (1; 30, 33), said recess (4) having a bottom surface (14) forming said abutment surface for said cutter elements.

5. The cutter of claim 4, wherein said cutter elements (6, 6a, 6b, 6c) are in engagement with said abutment surface (14).

6. The cutter of claim 1, wherein said clamping means comprise resilient means (16, 17, 18–20, 22).

7. The cutter of claim 6, wherein said resilient means comprises at least one undulating spring.

8. The cutter of claim 6, wherein said resilient means comprises an insert element placed in the groove, which insert element is formed of elastomeric material (16, 22).

9. The cutter of claim 8, wherein said insert element (16) is an elongated elastomeric body (16) longitudinally positioned in said groove.

10. The cutter of claim 8, wherein said insert element comprises an elongated body of elastomeric material of essentially rectangular cross section located in said groove with its longer side extending longitudinally of said groove.

11. The cutter of claim 6, wherein said resilient means comprises a piston acting against a gas pillow or cushion (18, 20).

12. The cutter of claim 1, wherein said third support surface (5a; 5b) is located on said radially inwardly extending portion of the respective cutter elements and said abutment surface means (14, 140) are located in said groove (2).

13. The cutter of claim 1, wherein at least one of said lateral support surfaces (5, 13) of the body define, with at least one of said engagement surfaces (11) and with the clamping element interposed, an acute angle of such value to obtain self-locking or self-clamping of the cutter element in said groove.

14. The cutter of claim (22), wherein the cutter element (6, 6a) has an essentially L-shaped cross section;

and at least one (10) of the legs of the L-shaped cutter element forms said radially inwardly extending portion and in cross section, is wedge-shaped, with its width decreasing towards the circumference of the cylindrical body.

15. The cutter of claim 14, wherein one of the engagement surfaces (11) of the cutter element is located at the inner side of the associated leg (10) of the L-shaped cutter element.

16. The cutter of claim 14, wherein said cutter element has two cutting edges (8), one each located at an end portion of the respective legs (9, 10) of the L-shaped cutter element, said legs being essentially identical, to permit turning over of said cutter element if one of the edges requires replacement, for the other one of the edges.

17. The cutter of claim 1, wherein said body comprises a body holding structure and a cutter element carrier (35), said cutter element carrier being elongated and clamped to said cutter element holding structure (1; 100, 30, 33).

18. The cutter of claim 1, wherein said cylindrical body (100; 30, 33) comprises a plurality of coaxial ring-shaped axially spaced and axially clamped portions;

the cutter elements comprise a plurality of axially subdivided cutter element sections, fitted axially in abutting relation with respect to each other;

rotary alignment means (44, 45) are provided, axially aligning said clamped portions;

and resilient means (47) located between said axially clamped portions and having a tendency to provide for axial separation of said portions.

19. The cutter of claim 1, wherein said clamping means comprise clamping screws (51) coupled for engagement with said clamping element (7') and engageable with the cylindrical body (1; 100, 30, 33) at the bottom or root of the groove (2).

20. The cutter of claim 19, wherein said clamping screws are fitted and threaded into said clamping elements (7') for engagement against the bottom (15) of the groove (2) to provide for radially outward pressure applied on said clamping means upon turning the screws towards the bottom (15) of the groove (2).

21. The cutter of claim 1, wherein the engagement surface (12) of the cutter elements (6, 6a, 6b, 6c) essentially are in alignment with the first lateral support surface (13) of the groove or project only slightly, with respect to the radial extension of the engagement surface, therebeyond.

* * * * *